United States Patent [19]

Shrader et al.

[11] Patent Number: 5,793,982
[45] Date of Patent: Aug. 11, 1998

[54] VALIDATING AN INSTALLATION PLAN CONTAINING MULTIPLE TRANSPORTS AND REDIRECTORS BY ADDING DATA STRUCTURE OF THE MODULES TO THE PLAN IF THE INDICATED TRANSPORT AND REDIRECTOR MODULES ARE UNAVAILABLE

[75] Inventors: Theodore Jack London Shrader. Cedar Park; John Lawrence Bunce. Austin; Diane Louise Skeel. Austin; George Edward Dever, Jr., Austin, all of Tex.

[73] Assignee: International Business Machine Corporation. Armonk, N.Y.

[21] Appl. No.: 570,179

[22] Filed: Dec. 7, 1995

[51] Int. Cl.⁶ .................................................. G06F 13/00
[52] U.S. Cl. ........................ 395/200.62; 395/200.3; 395/185.04; 395/670; 395/712; 371/20.4; 371/32
[58] Field of Search ............. 379/201; 380/4; 395/200.1, 500, 616, 200.3, 200.62, 185.04, 670, 712; 370/20.4, 32

[56] References Cited

U.S. PATENT DOCUMENTS

| | | | |
|---|---|---|---|
| 4,227,245 | 10/1980 | Edblad et al. | 364/468.01 |
| 4,558,412 | 12/1985 | Schmidt et al. | 707/203 |
| 4,584,639 | 4/1986 | Hardy | 395/186 |
| 4,674,115 | 6/1987 | Kaleita et al. | 379/201 |
| 5,138,701 | 8/1992 | Ohira et al. | 395/200.1 |
| 5,138,712 | 8/1992 | Corbin | 395/186 |
| 5,155,837 | 10/1992 | Liu et al. | 395/200.51 |
| 5,155,847 | 10/1992 | Kirouac et al. | 395/200.51 |
| 5,257,376 | 10/1993 | Beck et al. | 395/651 |
| 5,293,476 | 3/1994 | Wolber et al. | 345/356 |
| 5,295,244 | 3/1994 | Dev et al. | 345/357 |
| 5,315,703 | 5/1994 | Matheny et al. | 345/507 |
| 5,339,430 | 8/1994 | Lundin et al. | 395/685 |
| 5,339,435 | 8/1994 | Lubkin et al. | 395/712 |
| 5,349,674 | 9/1994 | Calvert et al. | 395/200.57 |
| 5,355,497 | 10/1994 | Cohen-Levy | 395/616 |
| 5,359,721 | 10/1994 | Kempf et al. | 395/685 |
| 5,359,730 | 10/1994 | Marron | 395/712 |
| 5,361,360 | 11/1994 | Ishigami et al. | 395/712 |
| 5,367,633 | 11/1994 | Matheny et al. | 345/514 |
| 5,369,570 | 11/1994 | Parad | 705/8 |
| 5,371,884 | 12/1994 | Ross | 395/182.08 |
| 5,379,430 | 1/1995 | Nguyen | 707/3 |
| 5,421,012 | 5/1995 | Khoyi et al. | 395/677 |
| 5,541,991 | 7/1996 | Benson et al. | 380/4 |
| 5,579,511 | 11/1996 | Cavasa et al. | 395/500 |

OTHER PUBLICATIONS

IBM Technical Disclosure Bulletin, vol. 37, No. 04A Apr. 1994, Automatic Creation of an Attribute Value File for IBM LAN NetView Start Databases. pp. 657–659.

IBM Technical Disclosure Bulletin, vol. 37, No. 02B Feb. 1994, Node List Presentation in the LAN NetView Start Transformer Status Window, pp. 9–10.

IBM Technical Disclosure Bulletin, vol. 37 No. 02B Feb. 1994, Technique for Implementing Topologies Within An IBM LAN Netview Start Network, pp. 545–546.

*Primary Examiner*—Thomas C. Lee
*Assistant Examiner*—Po C. Huang
*Attorney, Agent, or Firm*—Jeffrey S. LaBaw

[57] ABSTRACT

An installation plan object including application objects representing applications to be installed during an installation process and workstation objects representing the workstation on which the applications are to be installed is validated prior to executing the installation plan. According to the invention, multiple sets of communication modules, that is redirector and transport modules are capable of installing the applications on the workstations over a computer network. Therefore, the availability and compatibility of the redirectors and transports at the workstations must be assured. After the installation plan object is built by the user of application objects and workstation objects, the attributes of the application objects are examined for the communication modules which may be used for installation of the applications on the workstations. Next, the validation process determines whether the communication modules are available during the installation process at the workstations. If not, objects representing the unavailable communication modules to the installation plan such that when the installation process is executed the previously unavailable modules are provided.

20 Claims, 13 Drawing Sheets

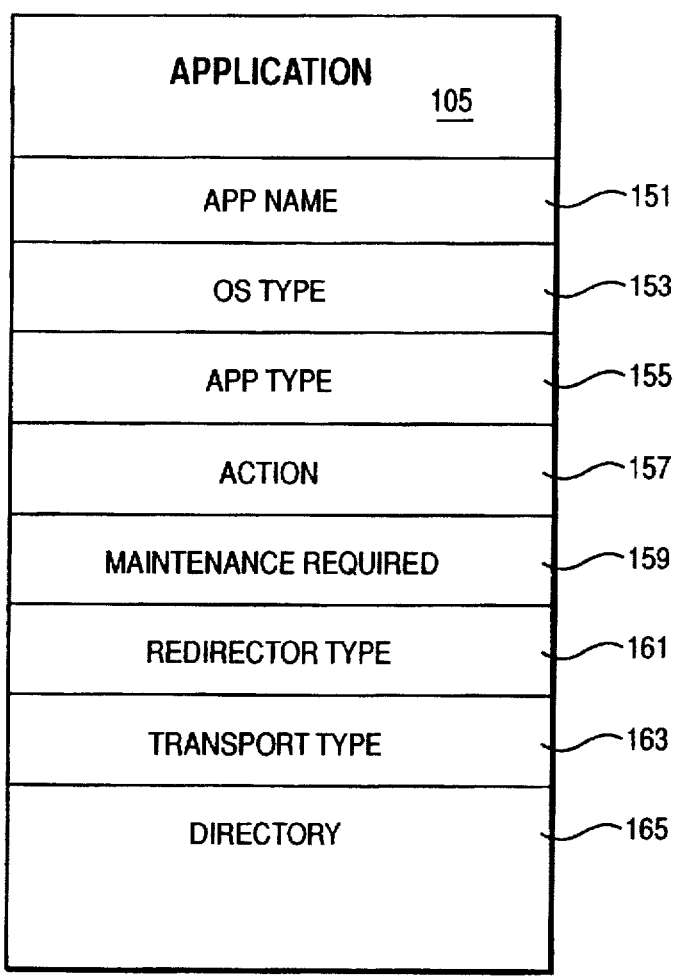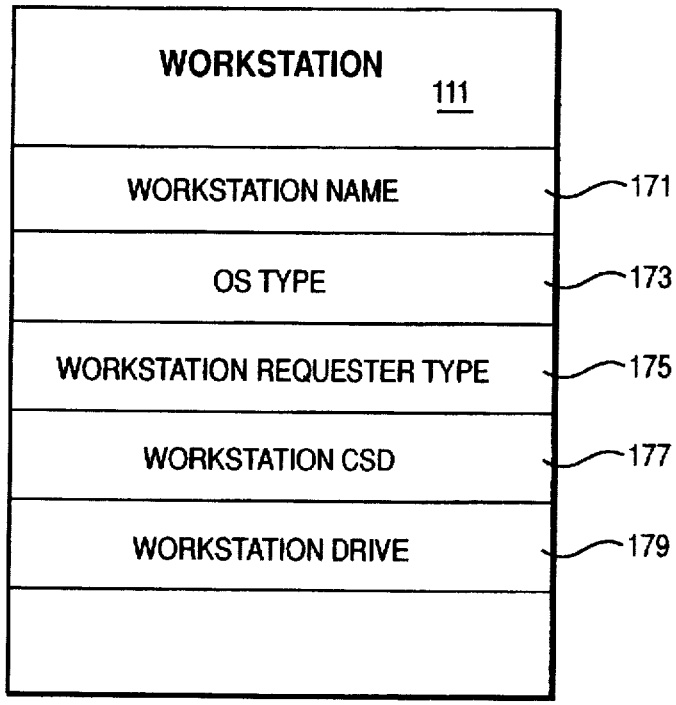
FIG. 4

5,793,982

VALIDATING AN INSTALLATION PLAN CONTAINING MULTIPLE TRANSPORTS AND REDIRECTORS BY ADDING DATA STRUCTURE OF THE MODULES TO THE PLAN IF THE INDICATED TRANSPORT AND REDIRECTOR MODULES ARE UNAVAILABLE

CROSS REFERENCE TO RELATED APPLICATIONS

This application is related to co-pending applications entitled "Install Plan Object For The Network Installation of Application Programs", Ser. No. 08/416,666, now abandoned and "Committing An Install Plan Object For The Network Installation Of Application Programs", Ser. No. 08/417,162 both filed on Apr. 5, 1995 both of which are hereby incorporated by reference. This application and the co-pending applications are assigned to the same assignee.

BACKGROUND OF THE INVENTION

This invention relates generally to electronic distribution of software in computer networks. More particularly, the invention relates to an architecture for validating a proposed plan for installing software, wherein the plan could contain multiple transports or redirectors before the plan is executed by the network administrator on the network.

It is common to couple a plurality of data processing systems interconnecting computing networks such as a Local Area Network (LAN) or a Wide Area Network (WAN). Each of the computer systems will have a plurality of software programs resident. In the infancy of such networks, a network administrator sat at each workstation with a set of diskettes and manually entered the parameters for each software product which needed to be installed, configured or maintained. With only a few workstations, administrators and users could afford to manually feed disks into their workstations and answer prompted questions during the installation or configuration process. As the size of the network increased, it naturally became more difficult to install software in such a manner. As the size and complexity of the network and the number of interdependencies between computer software products increased, configuring each workstation became an increasingly complex, time consuming, error prone process. Administrators could no longer afford this manual route and instead turned to products specifically designed to install and configure applications on workstations over the network.

It has therefore become increasingly accepted to install computer software and configure workstations remotely. One accepted term for this process is electronic software distribution (ESD). The electronic distribution of software within a network has been known in the art for almost a decade. Some of the more popular ESD products include: NetView Distribution Manager and the LAN Configuration Installation Distribution utility, both from the IBM Corporation and the Network Navigator from Novell. These products are designed to alleviate the onerous tasks of software distribution, installation and configuration over the network.

Although ESD products have been in existence for a number of years, these products do not completely address all problems faced by the network administrator. One of the largely unaddressed problems faced by the network administrator is the planning and execution of the distribution, installation and configuration of plurality of software programs on a group of workstations in the network. Because of the growing number of interdependencies between software products and the complexity of the networks, this is a daunting task.

There have been prior efforts to alleviate the burden on the network administrator. Previous efforts concentrated more on the "plumbing" of network installation, such as how to transport the images across the network or the physical building of the files needed in the installation and configuration process. These designs helped the administrator in the physical tasks, e.g., transporting an application throughout the network, but did not help the administrator plan what the physical tasks should be.

The inventions in the copending, crossreferenced applications decompose the network installation and configuration planning process into a series of discrete objects that help to abstract the problem and provide an easy, object-oriented, and graphical means by which administrators can set-up and view the applications that are slated to be installed and configured on a set of workstations on the LAN. The administrator can use this object-oriented representation to create the files needed for the physical installation and configuration process. The present invention solves a specialized problem not discussed in these applications: validating an install plan wherein multiple transports and redirectors are available for inclusion in the plan. Software may be an integrated package including its own redirector and transport modules or may be a separate application requiring the redirector and transport modules from another software product. In addition, the transport and/or redirector modules in an integrated software package may be replaced by other separately packaged modules for reasons of performance or compatibility. Where the transport and redirector modules may be mixed and matched in the install plan, they must be validated to be compatible with each other, the other applications and operating systems in the install plan as well as the workstation in the which the proposed plan is planned to be implemented.

The present invention represents an important improvement in electronic software distribution.

SUMMARY OF THE INVENTION

Therefore, it is an object of the invention to validate an installation plan object containing multiple transports and/or redirectors.

This and other objects are accomplished by validating an installation plan object including application objects representing applications to be installed during the installation process and workstation objects representing the workstation on which the applications are to be installed. According to the invention, multiple sets of communication modules, that is redirector and transport modules are capable of the applications on the workstations over a computer network. Therefore, the availability and compatibility of the redirectors and transports at the workstations must be assured. After the installation plan object is built by the user of application objects and workstation objects, the attributes of the application objects are examined for the communication modules which may be used for installation of the applications on the workstations. Next, the validation process determines whether the communication modules are available during the installation process at the workstations. If not, objects representing the unavailable communication modules to the installation plan such that when the installation process is executed the previously unavailable modules are provided.

As the installation plan is built, the user may include objects representing the desired communication modules in the installation plan, thus specifying the transport and redirector combination to be used. Alternatively, he may rely on the validation process to add a compatible set of communication modules. The validation process uses attributes in the workstation object and the application objects to determine a suitable transport and redirector if not provided and to check the objects included in the installation plan object for compatibility.

In the preferred embodiment, a single set of communication modules is used for a given installation plan for reasons of simplicity and ease of use. However, the installation plan may also include multiple objects representing multiple sets of communication modules for installing different sets of applications. If only a single redirector and a single transport is permitted for a given installation plan and there are several possibilities, the user is prompted with a list of compatible communication modules to select a set of communication modules for the installation process.

The user may indicate that a temporary installation of the communication modules is desired during the installation process by setting the action attribute in the objects which represent the communication modules to free system resource after installation.

BRIEF DESCRIPTION OF THE DRAWINGS

These objects, features and advantages will be more readily understood with reference to the attached figures and following description.

FIG. 4 shows an application object and a workstation object and their attributes.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal* Systems/2 Model 50, 60 Systems IBM Corporation, Part No. 68X2224 Order Number S68X-2224 and *Technical Reference 2 Manual Personal Systems/2 (Model 80) IBM Corporation* Part No. 68X 2256 Order Number S68X-2254. One operating system which an IBM PS/2 personal computer may run is IBM's OS/2 2.0 (TM) for more information on the IBM OS/2 2.0 Operating System the reader is referred to OS/2 2.0 *Technical Library, Programming Guide Vol.* 1, 2, 3 Version 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 is described in many publications of the IBM Corporation for example, *RISC System/6000, 7073 and 7016 POWERstation and POWERserver Hardware Technical* reference, Order No. SA23-2644-00. The AIX operating system is described in *General Concepts and Procedure—AIX Version 3 for RISC System/6000* Order No. SC23-2202-00 as well as other publications of the IBM Corporation.

Figure 1:
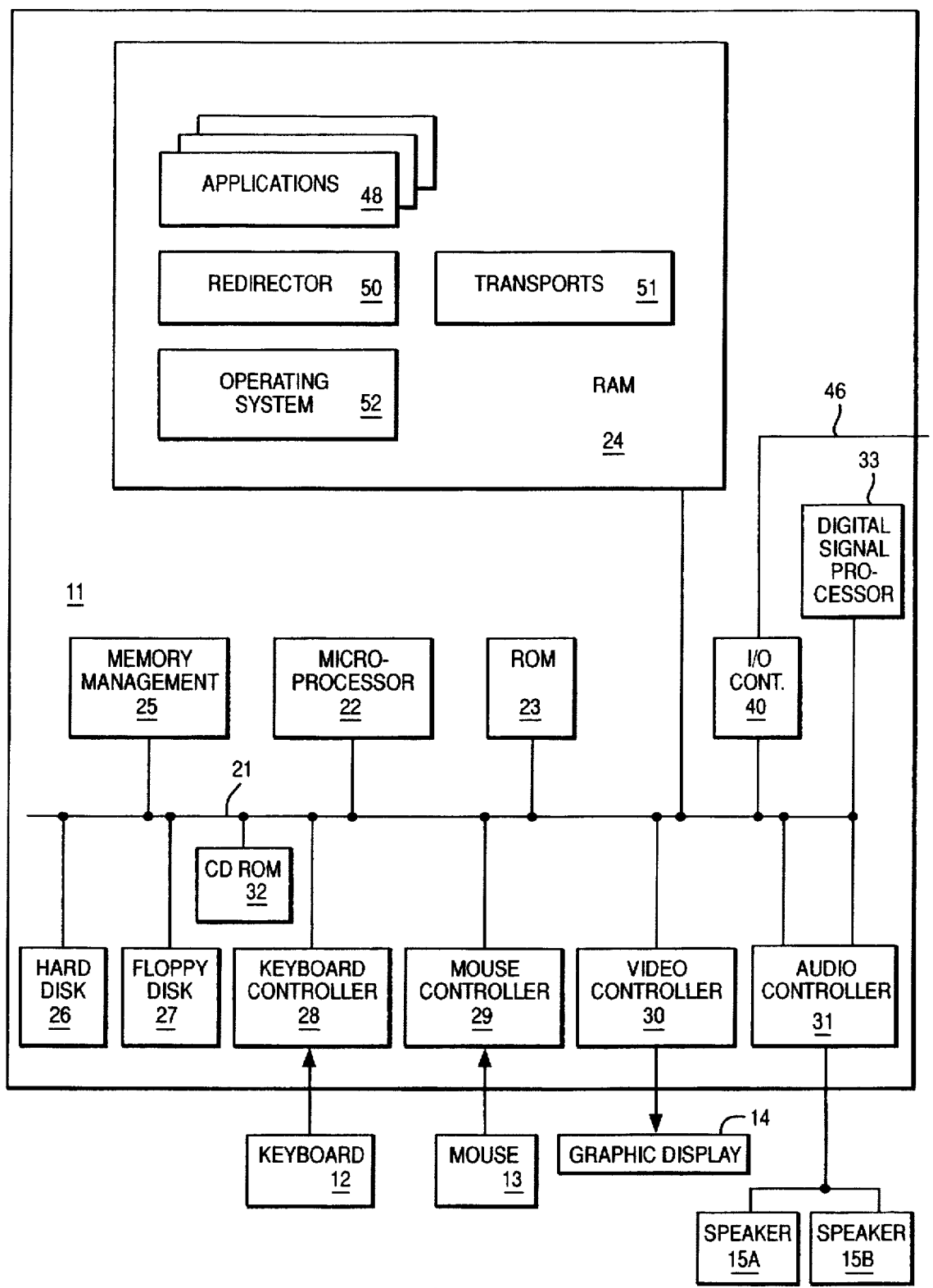
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or others by Hewlett Packard, Sun, Motorola and others may be used in the specific computer.

The ROM 23 contains among other code the Basic Input-Output system (BIOS) which controls basic hardware operations such as the interaction of the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. An I/O controller 40 such as a Token Ring Adapter enables communication over a network 46 to other similarly configured data processing systems.

One of the preferred implementations of the invention is as sets of instructions resident in the random access memory 24 of one or more computer systems configured generally as described above. Until required by the computer system, the set of instructions may be stored in another computer memory, for example, in the hard disk drive 26, or in a removable memory such as an optical disk for eventual use in the CD-ROM 32 or in a floppy disk for eventual use in the floppy disk drive 27. One skilled in the art would appreciate that the physical storage of the sets of instructions physically changes the medium upon which it is stored electrically, magnetically, or chemically so that the medium carries computer readable information.

While it is convenient to describe the invention in terms of instructions, symbols, characters, or the like, the reader should remember that all of these and similar terms should be associated with the appropriate physical elements. Further, the invention is often described in terms of comparing or validating, or other terms that could be associated with a human operator. No action by a human operator is desirable in any of the operations described herein which form part of the present invention; the operations are machine operations processing electrical signals to generate other electrical signals.

The network in which the workstation is integrated is a Local Area Network (LAN) or a Wide Area Network (WAN), the latter comprising a teleprocessing connection to other nodes or a network of systems operating under a known computer architecture. At any of the nodes, there may be one or more processing systems each of which may be a single user or a multi-user system configured more or less as described above. These processing systems operate as a client or server workstation depending upon whether it is requesting or supplying services. In one particular implementation, the invention runs on a plurality of IBM compatible workstations interconnected by the IBM OS/2 LAN Server architecture. Typical workstation software includes applications 48, redirector 50, transports 51 and operating system 52. The software applications may be packaged together or sold as separate applications. A simplified description of local area networks may be found in a book by Larry E. Jordan and Bruce Churchill entitled: *Communications and Networking For The IBM PC* Published by: Robert J. Brady (A Prentice Hall Company 1983). The simplest installation configuration for the administrator would be to have one code server on the LAN using a single set of redirectors and transports to allow the network installation program to install applications on workstations over the network. The present invention represents an improvement over the prior art in that the administrator may use more than one code server on the LAN as well as use a different set of transport and redirectors for each of the code servers.

The present invention is not bound to a particular method of electronic software distribution. It provides an installation plan for planning the installation process which contain proxy objects for the applications to be installed, the redirectors and transports to be used for the installation process and the workstations on which the applications are to be installed. By checking the attributes of the proxy objects to determine that there are no unpermitted inconsistencies or duplications, the installation plan is validated. The validated installation plan is then used to create the actual data structures used by the particular method of electronic distribution.

An important aspect of the invention is that the install plan object and its subcomponents are preferably implemented in an object oriented system. Further, the object oriented plan object can be used by a procedurally based installation engine such as IBM's LAN CID utility to validate the install plan. While objects and object oriented programming are known, a few facets are worth mentioning at this time. Each object has certain data attributes and methods which operate on the data. Data is said to be "encapsulated" by an object as attributes and can only be modified by the method which belongs to the object. Methods are typically invoked by sending a message to an object, identifying the desired method and supplying any needed arguments. Class objects can be subclassed to create new class objects which "inherit" methods from their parent classes. "Inheritance" is the ability to derive a new object from an existing object inheriting all properties such as methods and data structure from the existing object. The new object may have certain unique features such as new methods which are added to or override existing methods of the existing class. A new subclass specifies the methods and data which distinguish it from its already existing base class. Thus, the software developer does not need to develop an entirely new piece of code. He or she need only specify the new unique features of the software. For background information on object oriented technologies, concepts and conventions, the reader is referred to publications such as *Object Oriented Design With Applications*, by Grady Booch (The Benjamin/ Cummins Publishing Company, 1990) and *Object Oriented Software Construction*, by B. Meyer, (Prentice Hall, 1988). For the present invention, the object oriented nature of the install plan and its components allows the reuse of the base application and workstation objects by creating instances of those objects for multiple plan objects or group objects.

Figure 2:
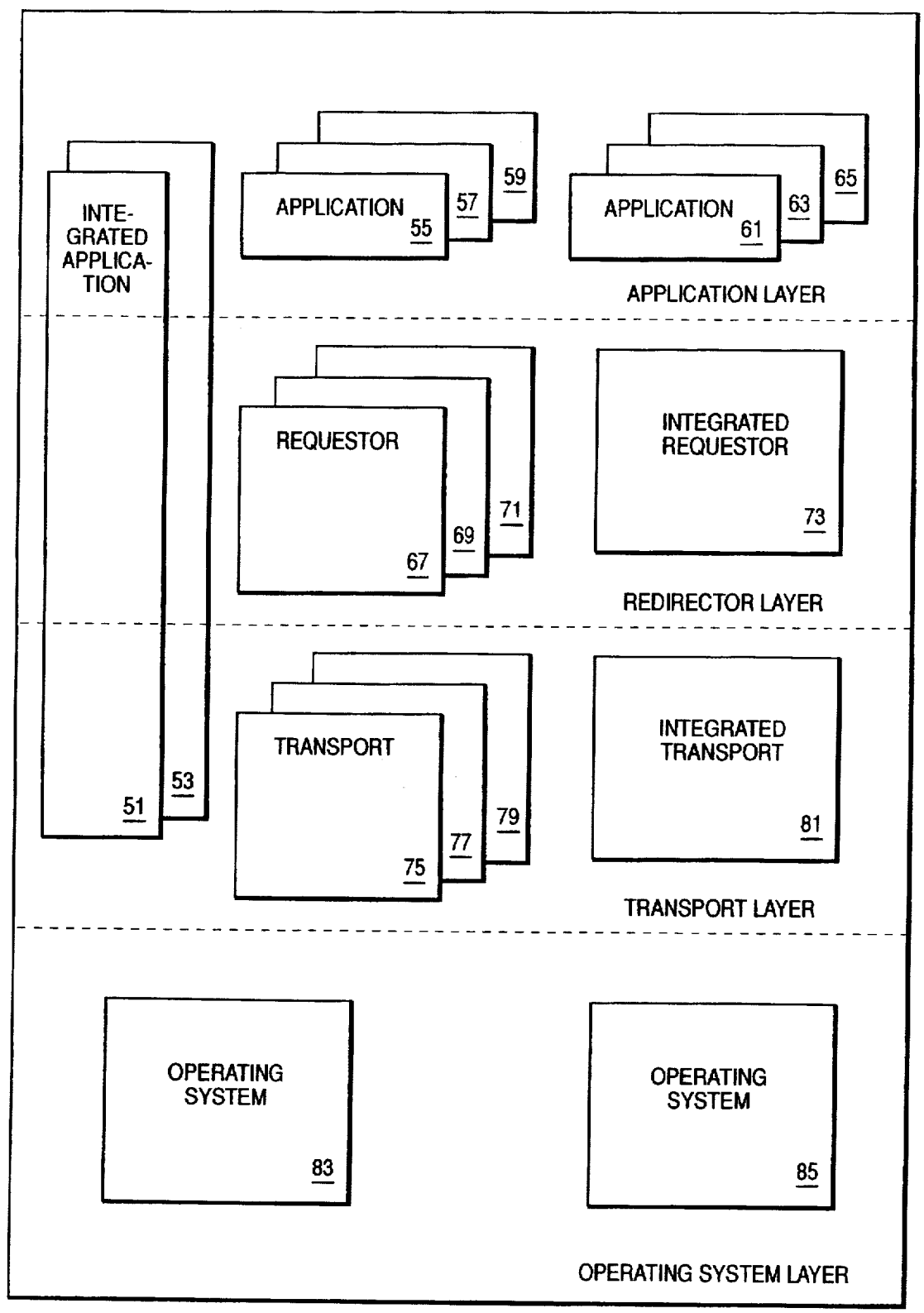
FIG. 2 shows an architectural diagram of the potential applications, redirectors, transports and operating systems to be installed in a given workstation.

FIG. 2 is an architectural diagram of some of the possible applications, redirectors, transports and operating systems which may be present in the memory of a computer system. According to the choices made by the network administrator creating the install plan object, proxy objects representative of the actual programs will be made child objects of the installation plan object. As shown in the figure, the memory can be thought of as comprising an application layer, a redirector layer, a transport layer and an operating system layer. Those skilled in the art would understand that other categorization of the layers are possible, however, the figure provides a convenient means of understanding the invention. The application layer is comprised of software programs designed to do a variety of tasks. It is with this layer that the user primarily interacts with a computer system. The applications are shielded by API layers from hardware details handled by the operating system or the actual location of called routines which are handed by the redirector, transport and other system layers. The redirector layer is responsible for handling an application call to another application. A redirector determines whether the called application is located at the local machine or is located somewhere over the network. If the called application is located at a remote machine, the redirector redirects the request via the transport layer. The transport layer comprises a variety of application programming interfaces (APIs) and communication and protocol layers through which applications at the local machine can communicate over the network to applications resident at remote machines.

Referring again to FIG. 2, some applications can be regarded as integrated applications 53, 54 spanning the application, redirector and transport layers. An example of an integrated application would be OS/2 LAN Server) a product of the IBM Corporation. Certain OS/2 utilities, i.e. applications, in the OS/2 LAN Server application communicate via API layers to a OS/2 LAN Requestor redirector module and an Multi-Protocol Transport Services (MPTS) transport module. The OS/2 LAN Server also includes DOS LAN Services and LAN Support Program, respectively a redirector and transport module for the DOS operating system. Each of these modules are separately callable by the installation process and can be separately represented by objects in the install plan. The invention may distribute standalone applications written for a variety of operating system, applications 55–59 might be written for a first operating system, e.g., OS/2 , while those of another set of applications 61–65 would be written for a second operating system, e.g., DOS. These applications could be conventional, e.g., wordprocessing or spreadsheet applications which are generally unaware of the network, or could be network enabled applications built to actively communicate with peer applications or server applications located elsewhere in the network.

The redirector layer is typically comprised of standalone redirectors 67–71. Each redirector is generally written for a specific operating system and transport protocol. For example, OS/2 LAN Requestor, a part of the OS/2 LAN Server product, is written for the OS/2 Operating System and uses the NetBIOS/NETBEUI API/protocol layers to transport client requests over the network. Network File System (NFS) is also written for the OS/2 operating system and is particularly used with the TCP/IP Network Protocol. Other redirectors would include, redirectors written for Novell NetWare (TM) clients using the SPX/IPX transport or DOS LAN Services written for the DOS Operating System. The invention also is suitable for an integrated redirector which would have separately installable modules for a plurality of operating systems and/or transport modules. Provisions would be made for objects to represent each of the separately installable modules in the installation plan.

The transport layer is typically comprised one or more support modules 75–79 written for a specific network protocol and operating system. For example, TCP/IP for OS/2 uses the TCP/IP protocol for the OS/2 Operating System over an Ethernet network. NetBIOS for OS/2 uses the NetBIOS API layer over NETBEUI transport protocol using a token ring network. Multiprotocol support modules 81 also exist such as the MPTS module of OS/2 LAN Server which provides a variety of protocols for a workstation. As an alternative to separate objects in the install plan, representing different transport types the integrated transport 81, a single object may represent the integrated transport which the workstation owner or network administrator would configure to provide particular desired network transports.

Finally, the operating system layer in the present invention might include one or more operating system 83–85. For example, OS/2 and DOS might be resident in the same workstation memory. The OS/2 operating system may run applications, requesters and transports written for the OS/2 operating system as well as those written for the DOS operating system. Of course, there are advantages in performance and capability running those applications written specifically for OS/2 . The DOS operating system may only run those applications, requesters and transports written specifically for DOS. During the installation process, the application images are stored in the memories of one or mode code servers in the network. The applications are sent to the network by use of the code server program, a redirector, and the transports resident at the code server. The applications are received from the network by the transports at the workstation and installed by the local redirector. The transports and redirector at the workstation may be those already resident or a temporary set compatible with those at the code server and the installation program.

While it is true that a particular application is often designed for a particular redirector module and transport, it is also true that there are cases that another redirector or transport may be preferable. For example, NetBIOS/NETBEUI is considerably faster than TCP/IP. It may be desirable to install an application originally written for TCP/IP installation over the NetBIOS/NETBEUI transport module. Conversely, the TCP/IP and Ethernet protocols have enjoyed much greater commercial success. It may be desired to have a single protocol over a particular network or the NetBIOS protocol may simply be unavailable from a particular code server.

In the prior art, an installation facility would only use a single redirector and a single transport module to accomplish the installation process. For example, IBM's LAN CID Utility used SRVIFS as the redirector and NetBIOS/ NETBEUI as the transport. Thus, the prior art never confronted the problem of using multiple redirectors and transports for the installation process. In the present invention, many different combinations of redirector and transport may be used, so long as they are compatible, or can be made compatible, with the applications and workstations contained in the install plan.

Figure 3:
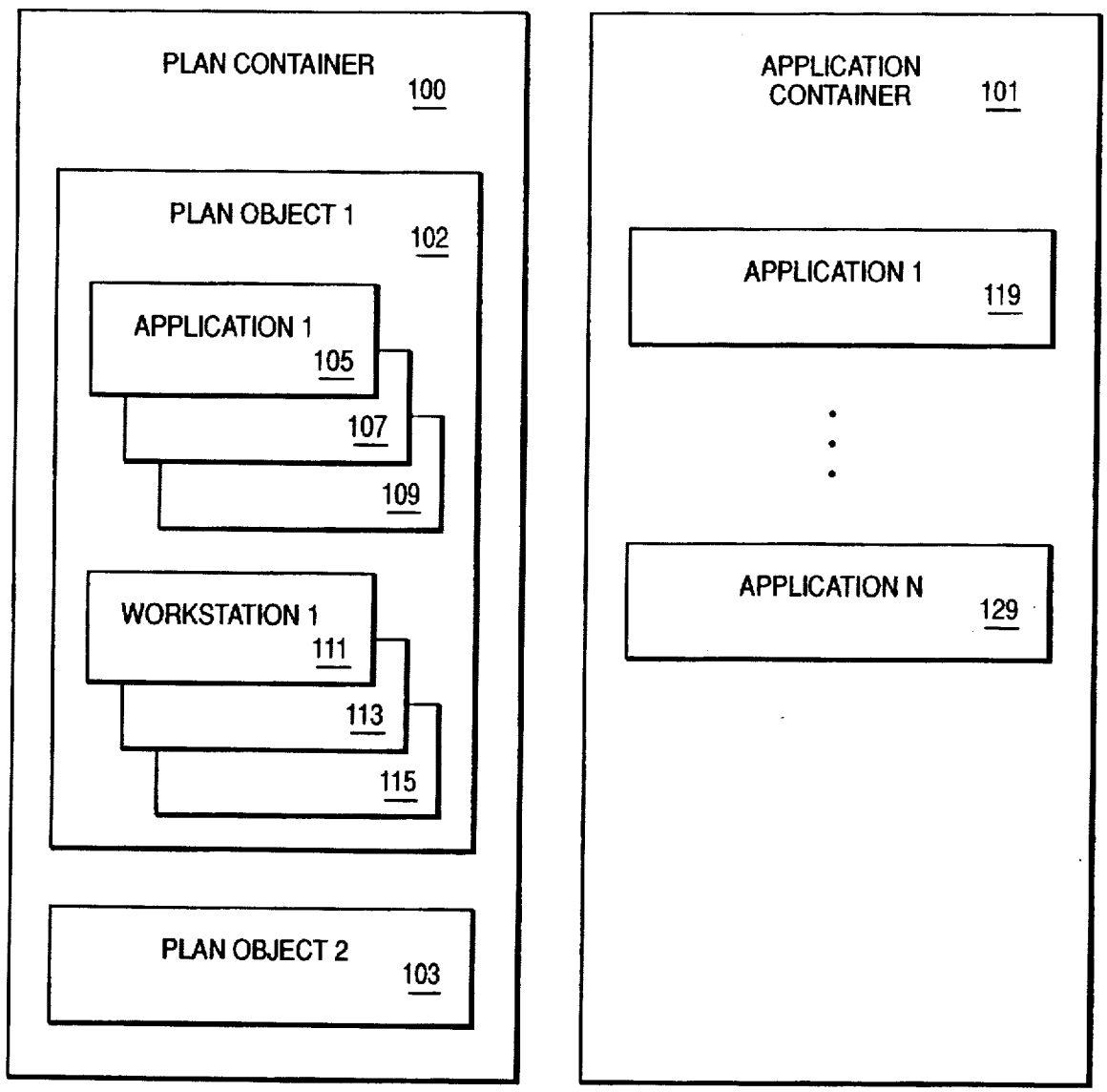
FIG. 3 shows a plan container object and an applications container object.

FIG. 3 depicts several of the objects used in the present invention. The plan container 100 and application container 101 are generalized container objects which contain the set of objects representative of the actual applications and workstations in the network environment. The plan container 100 contains a plurality of installation plan objects 101, 103. Each of the plan objects contains a plurality of application objects 105–109 and workstation objects 111–115. In the preferred embodiment, a set of applications represented in the plan object as application objects are all installed in the set of workstations represented in the plan object by workstation objects. The application and workstation objects are proxies of the actual applications and workstations and contain data as attributes which are used during the validation process to ascertain whether that a proposed plan may actually be implemented. That is, the proposed set of applications may be installed successfully on the proposed set of workstations.

The application container 101, contains a set of available applications 119–129 which are available for incorporation into a given plan object. In the model, rather than creating separate classes of redirector and transport objects, the redirectors and transports are represented by application objects having a redirector or transport attribute respectively, although separate classes of objects could be created in alternative embodiments. As will be discussed below, a graphical user interface may be provided in which a network administrator may drag and drop iconic representations of the application or workstation objects into a window or icon representing an installation plan object to incorporate a particular application or workstation in a plan object.

FIG. 4 depicts the application object 105 and workstation object 111 and some of their respective attributes. As mentioned above, the attributes of the application and workstation objects are used during the validation process to determine whether a particular plan object can be successfully installed over the specified workstations. The application object 105 includes an application name attribute 151, which is a short name by which the application is known to the installation process. The operating system type attribute 153 supplies the operating system for which the application was written, for example, OS/2 or DOS. As mentioned above, the applications were written for the DOS operating system may be used in the OS/2 operating system. Thus, a DOS application may have a primary operating system attribute for DOS, and if that is unavailable on a workstation in the plan, a secondary operating system attribute for OS/2 . During the validation process, the operating system attributes of application and workstation objects are checked to determine their compatibility. The application type attribute 155 specifies the type of application represented by the application object. For example, the application may be an operating system such as OS/2 or DOS. It may be a transport such as TCP/IP for OS/2 or it may be an redirector such OS/2 LAN Requestor which redirects the application request to the appropriate drive in a server/requester environment. The application could be a corrective service program fix for a previously installed application. Finally, it could be a conventional application such as a spreadsheet or wordprocessor.

The action attribute 157 indicates the type of action to carried out by the install process for the application. For example, actions might be the installation of the application, configuration changes to the application, reinstalling the application, removing the application or installing the maintenance version of the application. Some operating systems such as OS/2 have the capability of building a maintenance version of themselves. A maintenance version is one which includes the barest essentials of the operating system and can be used to provide operating system services which might be required during the installation process without installing the entire operating system. The maintenance required attribute 159 is used to indicate whether the application requires maintenance or not. Maintenance is a term used to indicate a temporary installation of the application. For example, a redirector, a transport and a maintenance system may only be required on the work station during the installation process. After the installation is complete, the redirector, transport and maintenance system are removed to free system resources for other applications. The redirector type attribute 161 is used to specify what type of redirector the application was written for and/or specified by the user. In one preferred embodiment of the invention, the application developer will supply application object for an application for use with the installation plan. The invention offers the user the opportunity to override the attributes of the supplied object for example, the user may select a different redirector. The transport type attribute 163 is used to specify the transport for which the application was written and/or the transport selected by the user. Like the operating system attribute, primary and secondary attributes may be used for the transport and redirector attributes if more than one is compatible with a given application. The directory attribute 165 indicates where the application is to be found in the network.

In the workstation object 111, the workstation name attribute 171 is a short unique name for the workstation in the network. The operating system type attribute 173 is the operating system currently resident at the workstation. A transport type attribute would specify the transport of the workstation (not shown). The workstation requester type attribute 175 is an opportunity for the user to specify the requester at the workstation. The workstation CSD attribute 177 is the current corrective service level of the operating system on the workstation. The workstation drive attribute 179 is the drive by which the workstation uses to boot the system.

Those skilled in the art would comprehend that other attributes may be used with the application and workstation objects. Also, the attributes may have multiple entries without indicating primary or secondary, if desired.

The program which creates the install plan object can be shipped with a set of fully-defined application objects and template and sample objects for workstations for a particular application. In such a configuration, most, if not all, of the attributes and commands which the application needs to perform installations and configurations are provided. If administrators need to install and configure additional applications or modify the installation and configuration of existing applications, they can modify the existing objects as required, create a plan object, and drag the workstation and application objects into the newly created plan object. The reuse of the application objects and the workstation objects for different plans is one particularly important facet of the invention. They do not need to be created again to be used in other plans.

Figure 5:
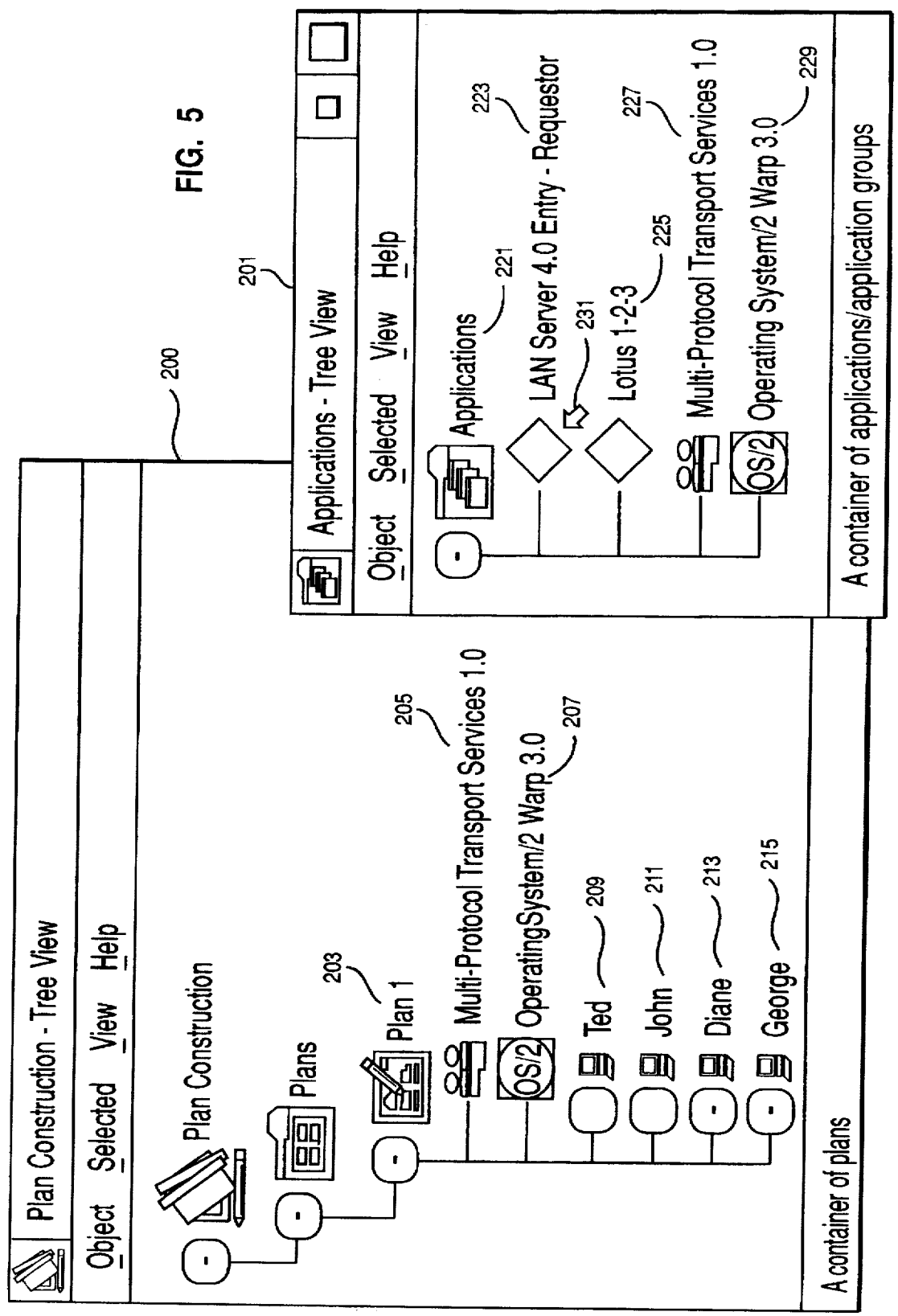
FIG. 5 depicts a preferred graphical user interface depicting a tree view of a application container object and a plan container object.

FIG. 5 depicts a sample graphical user interface in which a user could add application objects to an installation plan object. Plan container is depicted in window 200 and application container is depicted in window 201. Those skilled in the art would understand that a great many more plan objects and application objects could be available in the containers. Both windows show a tree view of the objects. In this way, the hierarchical nature of the objects is displayed to the user. For example, first plan object 203 has two application objects, 205 and 207 and four workstation objects 209, 211, 213 and 215 as child objects. Similarly, the applications container object 221 has four application child objects 223, 225, 227 and 229. In the first plan object 203, the user has selected for the Multi-Protocol Transport Services as the transport for installation and the OS/2 WARP 3.0 Operating System to be installed on the four workstations, 209, 211, 213 and 215. Unless a redirector was already resident on the workstations, the user would continue to add a redirector object to the plan object 203. For example, the user could drag and drop the LAN Server Entry Requestor icon 223 by means of the pointer icon 231 on to the plan icon 203. Drag-and-drop is a well understood mechanism of manipulating objects in a graphical user interfaces. Alternatively, the user could simply allow the validation process of the present invention to add other objects to the plan so that the required redirector and transport functions would be provided during the installation process.

Figure 6:
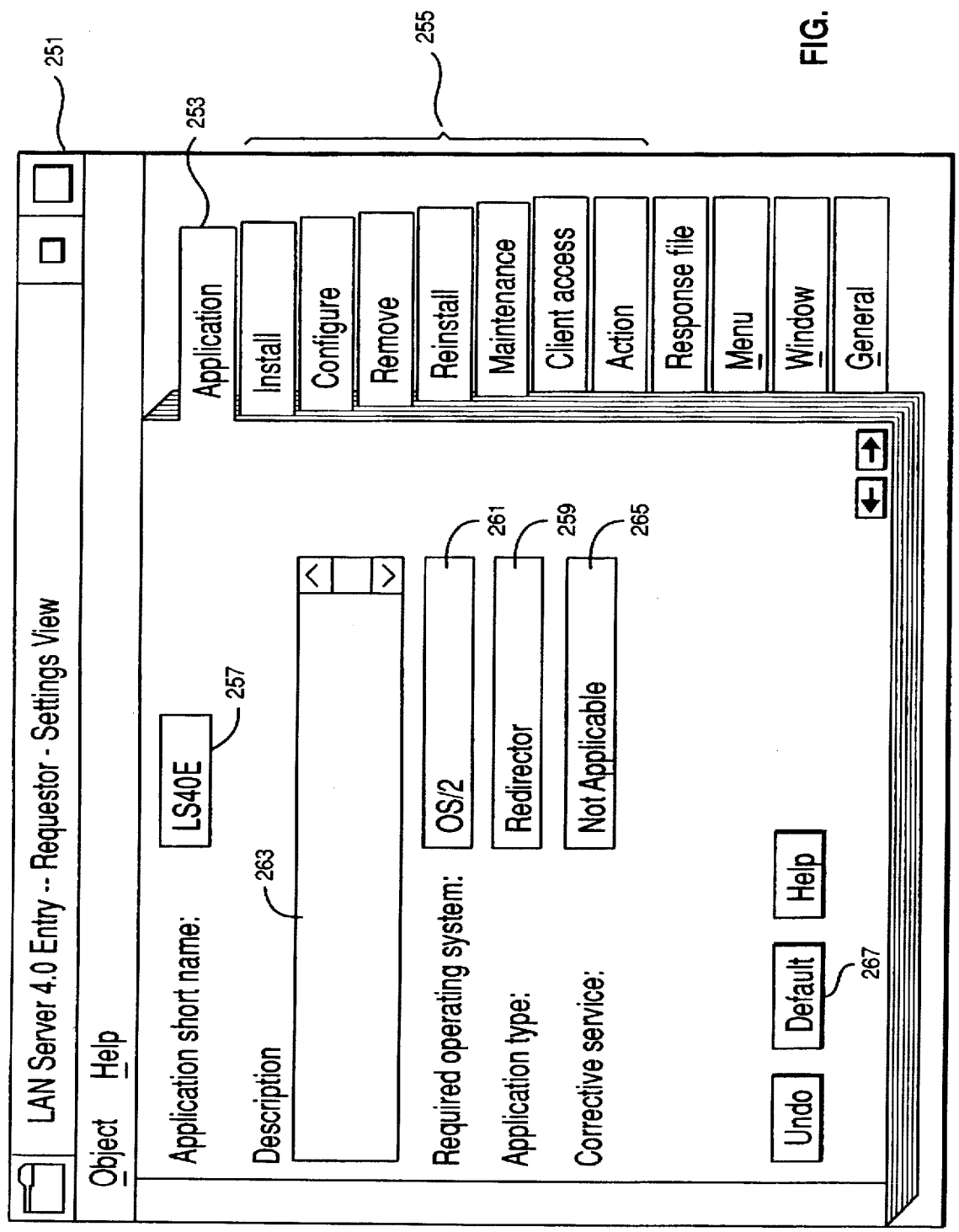
FIG. 6 depicts a settings view and a notebook graphical user interface of an application object.

Prior to validating or committing the plan object, the attributes of the application objects may be modified by the user as well. A notebook interface as shown in FIG. 6 is one convenient means to adjust a large number of parameters. As shown in notebook window 251, the application page 253 is the first page of the notebook. On the application page 253, a plurality of entries fields 257–267 are available to change the attributes of the LAN Server Entry Requestor object. For more complicated attributes such as an action attribute, separate pages 255 are provided to modify these attributes. The application name attribute is modified in entry field 257. The application type is indicated as redirector in entry field 259. A required operating system attribute is listed as OS/2 in entry field 261. A description field 263 is available for user comment. A correct service entry field 265 is available to indicate the level of corrective service which has been applied to the application. Alternatively, the user may view and/or use the application defaults for a given attribute by pressing default pushbutton 267.

Other objects useful in the graphical user interface but not depicted in the figures would include a workstation container object for containing specified or sample workstation objects. The workstation container may be used in a similar manner to the application container discussed above, i.e. a workstation icon can be dragged and dropped on the plan icon. A code server container object could be provided to indicate the applications available at a given code server for distribution in the network. The code server window would contain application icons for each of the available applications.

Once the administrator has added and customized all the desired applications and workstations in the install plan, the administrator needs to first validate the plan before committing it to an actual installation process. With the possibility of multiple transports and redirectors in the plan, the validation process detailed below should consider the following problems. In the preferred embodiment, only one transport and one redirector may be used in a given plan. If a different redirector or transport is required to install a given application, a separate plan object is used for the application. In this embodiment, all the applications in the plan will be checked to see if there is more than one application whose application type attribute is transport and action attribute is maintenance. If more than one such application exists, the validation process will write an error to the validation log file.

All the applications in the plan will be checked to see if there is more than one application whose application type is operating system and action is install. If more than one such application exists, the validation process will write a warning to the validation log file. In certain situations, an administrator may want to install one operating system on one drive of the workstations in the plan and another operating system on a different drive.

All the applications in the plan will be checked to see any of them require a maintenance system. If none of the applications require a maintenance system, the validation process will skip to the regular validation routines where the individual objects in the plan are examined for correctness, such as the physical existence of a file in the network needed for installation of an application on a workstation.

The operating system application attribute for all the workstations in the plan will be checked to insure that the specified operating system application exists in the application container, i.e. accessible in the network. This insures that a required operating system is available when the install plan is executed. If this condition is not met, the validation process will log an error, but will continue to look for other validation errors. For example, a workstation may have OS/2 WARP defined as its operating system application attribute.

If the plan contains an application of the transport type whose action is maintenance and has an operating system type, such as OS/2 or DOS, which matches the workstations in the plan, or the workstation already have the required transport resident, the transport addition check can be skipped. Otherwise, a transport application object will need to be added to the plan to allow the administrator to customize the attributes of the transport application. If the application container contains only one application of the transport type which and has an operating system type which matches the workstations in the plan, a copy of this application may be added to the plan at the end of this validation strategy. Alternatively, if more than one application meets this criteria, the validation process will present a list to the administrator to choose which transport application should be added to the plan. A copy of the selected application will be added to the plan at the end of this validation strategy.

If the plan contains an application of the redirector type whose action is maintenance, has an operating system type which matches those of the workstations in the plan, and has redirector category attribute which matches the application in the plan that require a maintenance system, or the workstations already have the required redirector resident, the redirector addition check can be skipped. Otherwise, a redirector application object will need to be added to the plan to allow the administrator to customize the attributes of the redirector application. If the application container contains only one application of the redirector type which has an operating system type which matches the workstations in the plan, and has redirector category attribute which matches the applications in the plan that require a maintenance system, a copy of this application may be added to the plan at the end of this validation strategy. If more than one application meets this criteria, the validation process will present a list to the administrator to choose which redirector application should be added to the plan since the validation process cannot arbitrarily choose which should be selected. A copy of this application will be added to the plan at the end of this validation strategy.

At the completion of this portion of the validation routine which follows the strategy for checking multiple transports and redirectors, the validation process will check to see if any validation errors occurred. If there were errors in the log file, the validation process will exit the validation process and present the log file to the administrator to allow the problems to be viewed and corrections to be made. It would not be appropriate to add any transports and/or redirector objects to the plan if an error occurred before the end of this stage.

Figure 7:
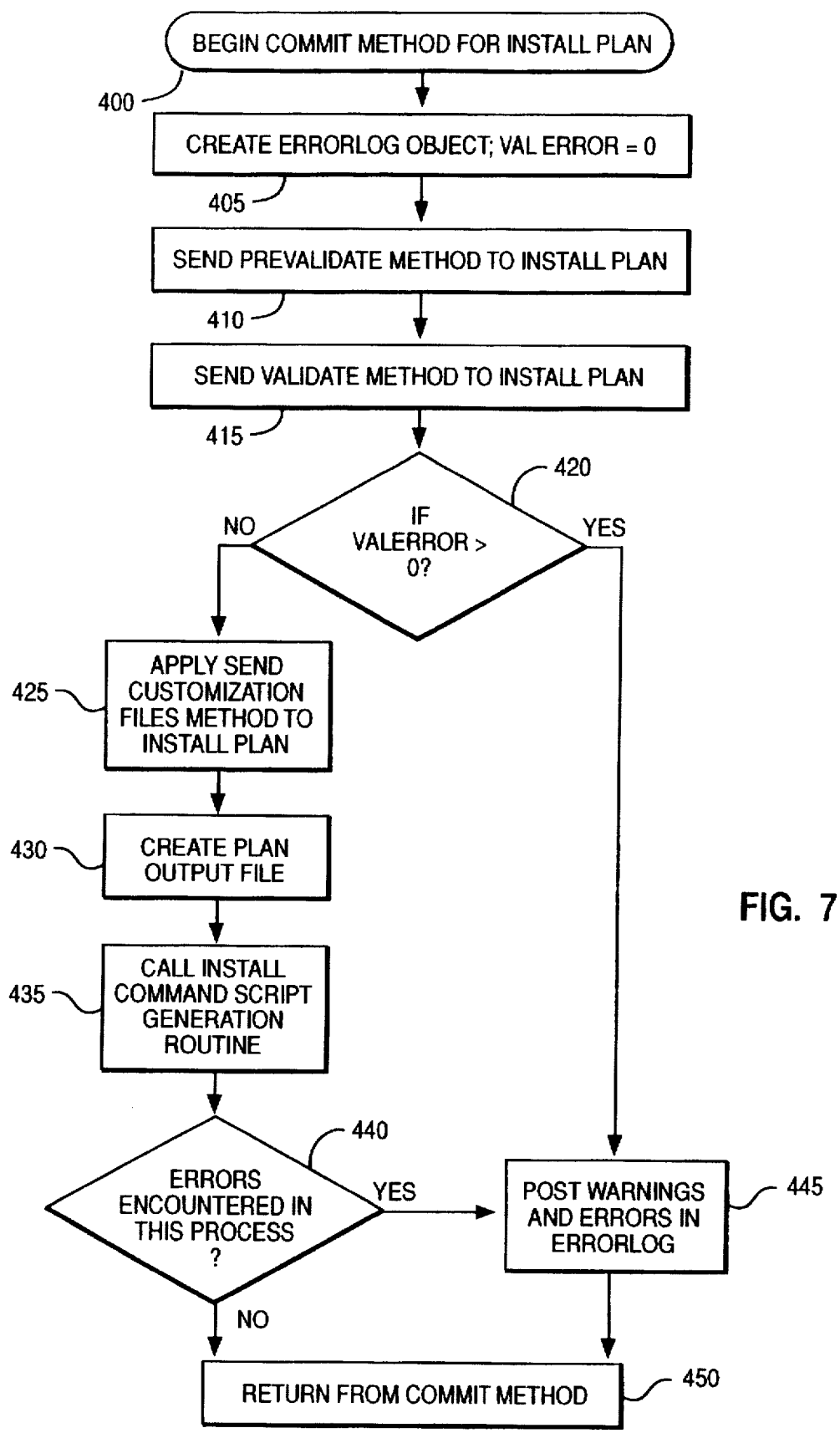
FIG. 7 is a flow diagram of the commit process.

The commit process to transform the objects in an install plan to files that can be used by the physical installation and configuration process for an install plan begins with the administrator initiating this event through an action, such as selecting a Commit menu item from the install plan menu. This action causes the COMMIT method to be sent to the install plan object in method entry block 400 in FIG. 7. The commit process continues in step 405 where the install plan object creates the error log object ERRORLOG to store status, warning, and error messages encountered during the commit process. The VALERROR counter is also set to keep track of severe errors encountered during the validation process.

Next, the PREVALIDATE method is sent to the install plan object in step 410. The PREVALIDATE method adds objects or attributes to a plan object if they are needed for a successful install or configuration and is shown in greater detail in FIGS. 8–13. After PREVALIDATE returns, the VALIDATE method which checks for correct data in the plan is sent to the install plan object in 415. The VALERROR counter is checked in decision block 420. If the VALERROR counter is greater than zero, processing continues with step 445 where the ERRORLOG object posts the warnings and errors it encountered during the commit process. After posting the log, the COMMIT method ends in return block 450.

If the VALERROR counter is zero, commit processing continues to step 425 where the APPLY CUSTOMIZATION FILES method shown is sent to the install plan object. After the return from the APPLY CUSTOMIZATION FILES method, the install plan object creates the Plan Output File in step 430. The Plan Output File acts as a data intermediary to the INSTALL COMMAND SCRIPT GENERATION routine which is called in step 435. After the INSTALL COMMAND SCRIPT GENERATION routine returns, the install plan checks to see if any errors were encountered in the remaining part of the commit process in decision block 440. If errors were encountered, processing continues to step 445. If no errors were encountered, the COMMIT method ends in return block 450.

Figure 8:
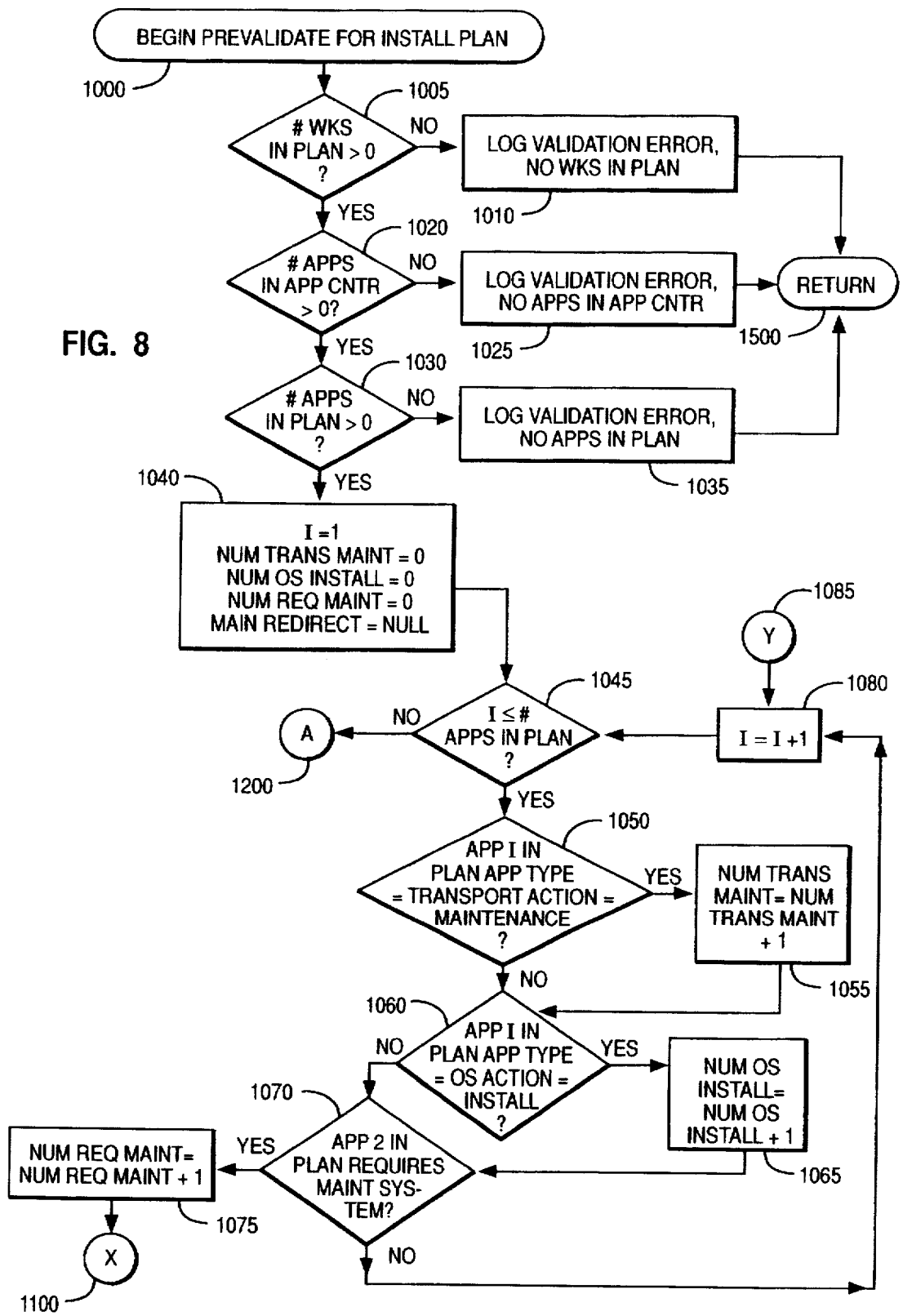
FIGS. 8–12 are flow diagrams of the validation process for an install plan object having multiple transports and redirectors.

The PREVALIDATE method for the install plan object begins with method entry block 100 in FIG. 8. Prevalidation is different from validation in that it will add objects or attributes to the install plan if they are needed.

Processing for the prevalidation of the installation plan for multiple redirectors and transports begins on FIG. 8 with the entry block 1000 and continues to decision block 1005 where the number of workstations in the plan are tabulated. If the plan does not contain any workstations, processing continues to control block 1010 where a validation error is written to the log file indicating that there were no workstations in the plan. Processing then ends with return from the PREVALIDATE method in return block 1500.

If the plan contains at least one workstation, processing continues to decision block 1020 where the number of applications in the applications container are tabulated. If the applications container does not contain any applications, processing continues to control block 1025 where a validation error is written to the log file indicating that there were no applications in the applications container. Processing then ends with the return from the PREVALIDATE method in return block 1500.

If the plan contains at least one application, processing continues to control block 1040 where several variables are set. Counter I is set to 1. Variable numtransmaint is set to 0. This variable indicates the number of applications in the plan with an application type of transport and action type of maintenance. Variable numosinstall is set to 0. This variable indicates the number of applications in the plan with an application type of operating system and action type of install.

Variable numreqmaint is set to 0. This variable indicates the number of applications in the plan that require a maintenance system. Variable mainredircat is set to NULL. This variable stores the redirection category for the first application in the plan that requires a maintenance system.

Processing continues to decision block 1045 where counter I is checked to see if it is less than or equal to the number of applications in the plan. If counter I exceeds the number of applications in the plan, processing continues with connecting point A 1200 on FIG. 10.

If counter I is less than or equal to the number of applications in the plan, processing continues to decision block 1050 where the application in the plan with index I is checked to see if its application type is transport and action type is maintenance. If this condition is false, processing continues to decision block 1060. If this condition is true, processing continues to control block 1055 where variable numtransmaint is incremented by one before processing moves to decision block 1060.

At decision block 1060, the application in the plan with index I is checked to see if its application type is operating system and action type is install. If this condition is false, processing continues to decision block 1070. If this condition is true, processing continues to control block 1065 where variable numosinstall is incremented by one before processing moves to decision block 1070.

At decision block 1070, the application in the plan with index I is checked to see if it requires a maintenance system. If this condition is false, processing continues to control block 1080 where counter I is incremented by 1. After increasing counter I, processing continues to decision block 1045. Note that connecting point Y 1085 also feeds into control block 1080.

Figure 9:
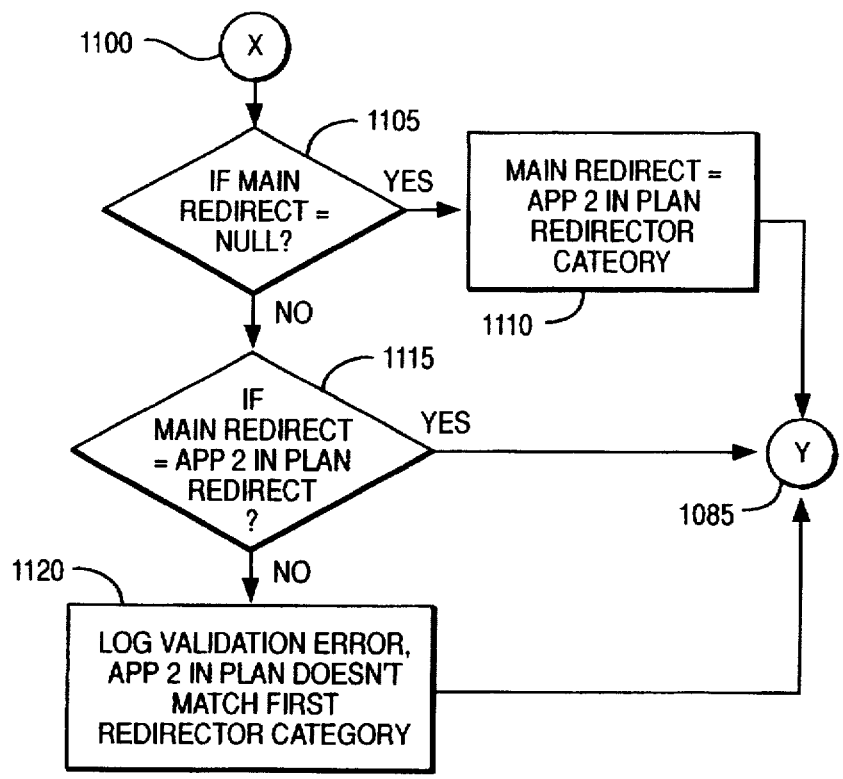

If the application in the plan with index I requires a maintenance system, processing continues to control block 1075 where variable numreqmaint is incremented by one before processing moves to connecting point X 1100 on FIG. 9.

FIG. 9 begins with connecting point X 1100 which directs the processing flow to decision block 1105. If variable mainredircat is NULL, meaning that it has not yet been set, processing continues to control block 1110 where variable mainredircat is set to the redirection category of the application in the plan with index I. Processing then continues to connecting point Y 1085 on FIG. 8.

If variable mainredircat is not NULL, meaning that it has been set and that an application that requires a maintenance system has been encountered in the plan, processing continues to decision block 1115 where the value of variable mainredircat is checked against the reduction category of the application in the plan with index I. If this condition is true, processing continues to connecting point Y 1085 on FIG. 8.

If the value of variable mainredircat is not equal to the redirection category of the application in the plan with index I, processing continues to control block 1120 where a validation error is written to the log file indicating that the application in the plan with index I that requires a maintenance system does not have a matching redirection category with an application that requires a maintenance system in the plan. Processing next continues to connecting point Y 1085 on FIG. 8.

Figure 10:
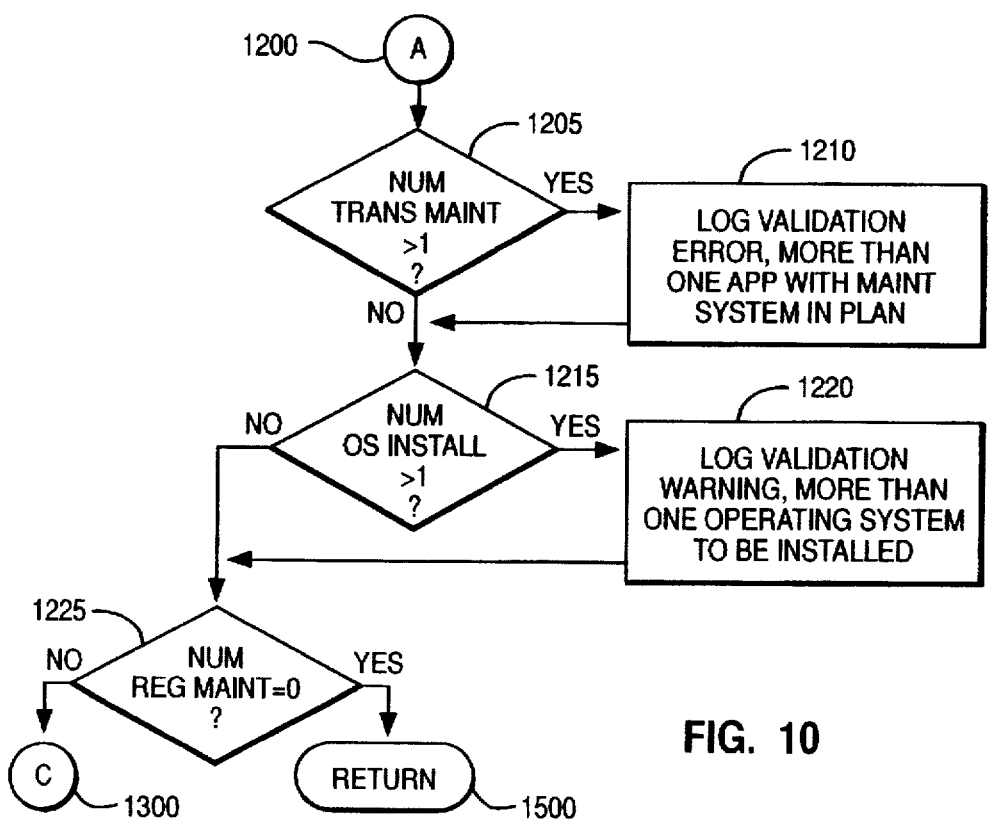

FIG. 10 beings with connecting point A 1200 which directs the processing flow to decision block 1205. If the value for variable numtransmaint is greater than 1, processing continues to control block 1210 where a validation error is written to the log file indicating that more than one application with an application type of transport and action type of maintenance resides in the plan. Processing then continues to decision block 1215.

If the value for variable numtransmaint is not greater than 1 in decision block 1205, processing continues to decision block 1215. If the value for variable numosinstall is greater than 1, processing continues to control block 1220 where a validation warning is written to the log file indicating that more than one application with an application type of operating system is slated to be installed on the workstations in the plan. Processing then continues to decision block 1225.

If the value for variable numosinstall is not greater than 1 in decision block 1215, processing continues to decision block 1225 where the value for numreqmaint is checked to see if it equals 0. If there are no applications in the plan that require a maintenance system, processing ends with the return from the prevalidate method in return block 1500. If there are applications in the plan that require a maintenance system in decision block 1225, processing continues to connecting point C 1300 on FIG. 11.

Figure 11:
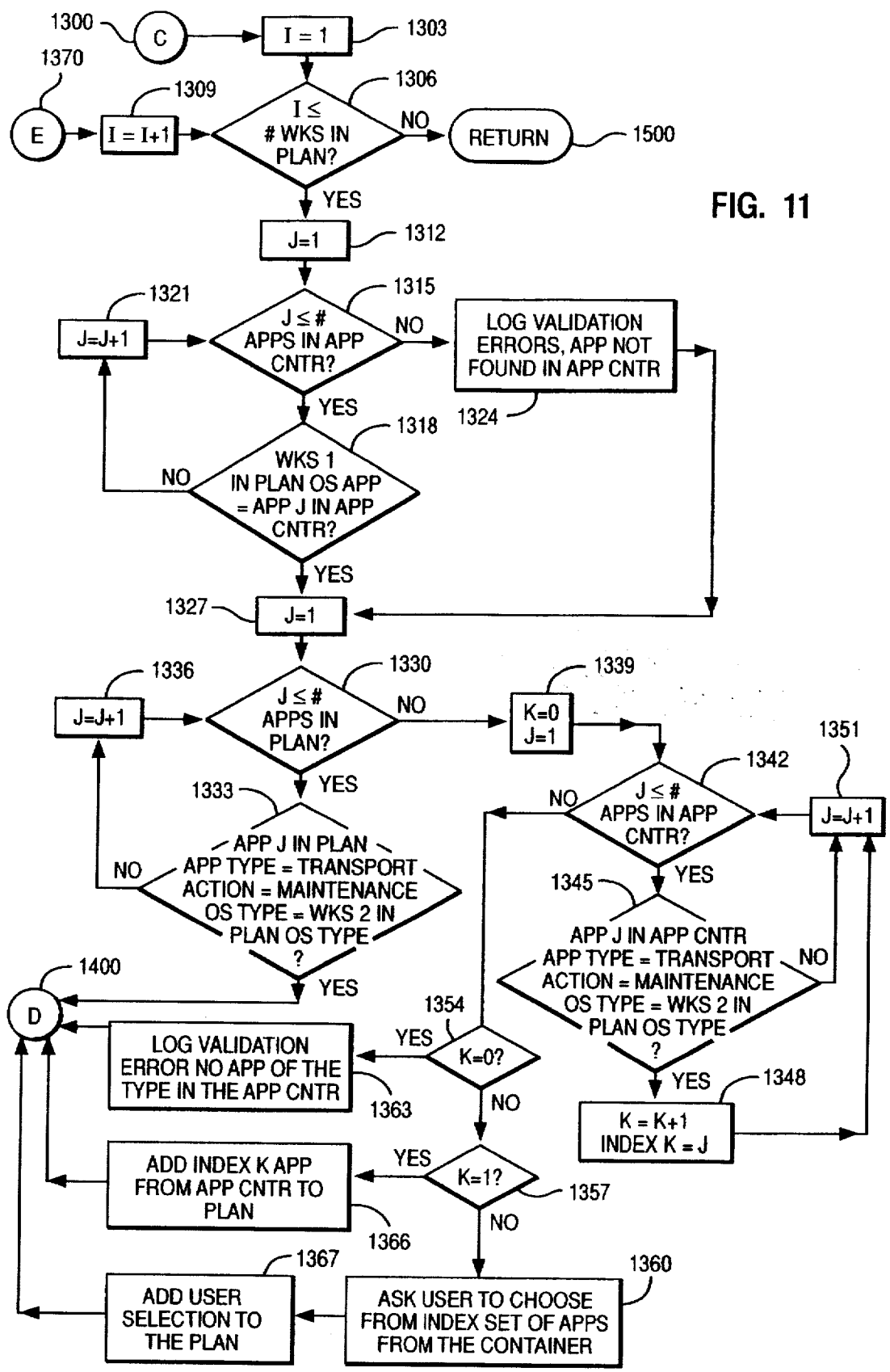

FIG. 11 begins with connecting point C 1300 which directs processing flow to control block 1303 where counter I is set to 1. Next, decision block 1306 checks if counter I is less than or equal to the number of workstations in the plan. If this condition is false, meaning all the workstations in the plan have been checked, processing ends with the return from the PREVALIDATE method in return block 1500. Note that connecting point E 1370 also feeds to control block 1309 where counter I is incremented by 1. After counter I is increased, processing continues to decision block 1306.

If not all the workstations in the plan have been checked in decision block 1306, processing continues to control block 1312 where counter J is set to 1. Processing next continues to decision block 1315 where counter J is checked to see if it is less than or equal to the number of applications in the applications container. If this condition is false, meaning all the applications in the applications container have been checked, but none were found that match the operating system of the workstation indexed by I, processing continues to control block 1324 where a validation error is written to the log file indicating that the operating system specified as existing on the workstation in the plan indexed by I was not found in the applications container. Processing then proceeds with control block 1327.

If not all the applications in the applications container have been checked in decision block 1315, processing continues to decision block 1318 where the operating system application specified as existing on the workstation in the plan indexed by I is checked to see if it is equal to the application in the applications container indexed by J. If this condition is true, processing continues to control block 1327. If the condition is not true, processing continues to control block 1321 where counter J is incremented by one. After counter J is increased, processing continues to decision block 1315.

At control block 1327, counter J is set to 0. Next, decision block 1330 checks to see if counter J is less than or equal to the number of applications in the plan. If this condition is true, meaning that not all the applications in the plan have been checked, processing continues to decision block 1333 where the application in the plan with index J is checked to see if its application type is transport, action type is maintenance, and operating system type matches the operating system type of the workstation in the plan indexed by I. If this condition is true, processing continues to connecting point D 1400 on FIG. 12. If this condition is not true, processing continues to control block 1336 where counter J is incremented by 1. Afterwards, processing resumes at decision block 1330.

If counter J is greater than the number of applications in the plan at decision block 1330, processing continues to control block 1339 where counter J is set to 1 and counter K is set to 0. Afterwards, decision block 1342 checks to see if counter J is less than or equal to the number of applications in the applications container. If this condition is true, processing continues to decision block 1345 where the application in the applications container indexed by J is checked to see if its application type is transport, action type is maintenance, and if its operating system type is equal to the operating system of the workstation in the plan indexed by I. If this condition is false, processing continues to control block 1351 where counter J is incremented by 1. Afterwards, processing continues with decision block 1342.

If the condition in decision block 1345 is true, processing continues to control block 1348 where counter K is incremented by 1 and the sequence INDEX indexed by K is set to the value of counter J. Afterwards, processing continues to control block 1351.

If all the applications in the applications container were checked in decision block 1342, processing continues to decision block 1354. This decision block checks to see if the value for counter K is zero. If this condition is true, processing continues to control block 1363 where a validation error is written to the log file indicating that no applications with the same application type of the operating system of the workstation indexed by I with an application type of transport and action type of maintenance were found in the plan or in the applications container. Afterwards processing continues with connecting point D 1400 in FIG. 12.

If the value of counter K is not zero in decision block 1354, processing continues to decision block 1357 where the value of counter K is checked to see if it is 1. If this condition is true, then exactly one application which matches the operating system type of the workstation indexed by I with an application type of transport and action type of maintenance was found in the applications container. This matching application can be added by taking a copy of it from the applications container and adding it to the plan automatically in control block 1366. This process increases the set of applications in the plan. Afterwards processing continues with connecting point D 1400 in FIG. 14.

If the value of counter K is not 1 in decision block 1357, processing continues to control block 1360. At this stage, more than one application matches the operating system type of the workstation indexed by I with an application type of transport and action type of maintenance was found in the applications container. A list of these applications are presented to the administrator in control block 1360 and the administrator selects an application from the list populated by the sequence INDEX up to counter K entries. After the selection is made, processing continues with control block 1367 where the administrator-selected application is added to the plan by taking a copy of it from the applications container and adding it to the plan. This process increases the set of applications in the plan. Afterwards, processing continues with connecting point D 1400 in FIG. 14.

Figure 12:
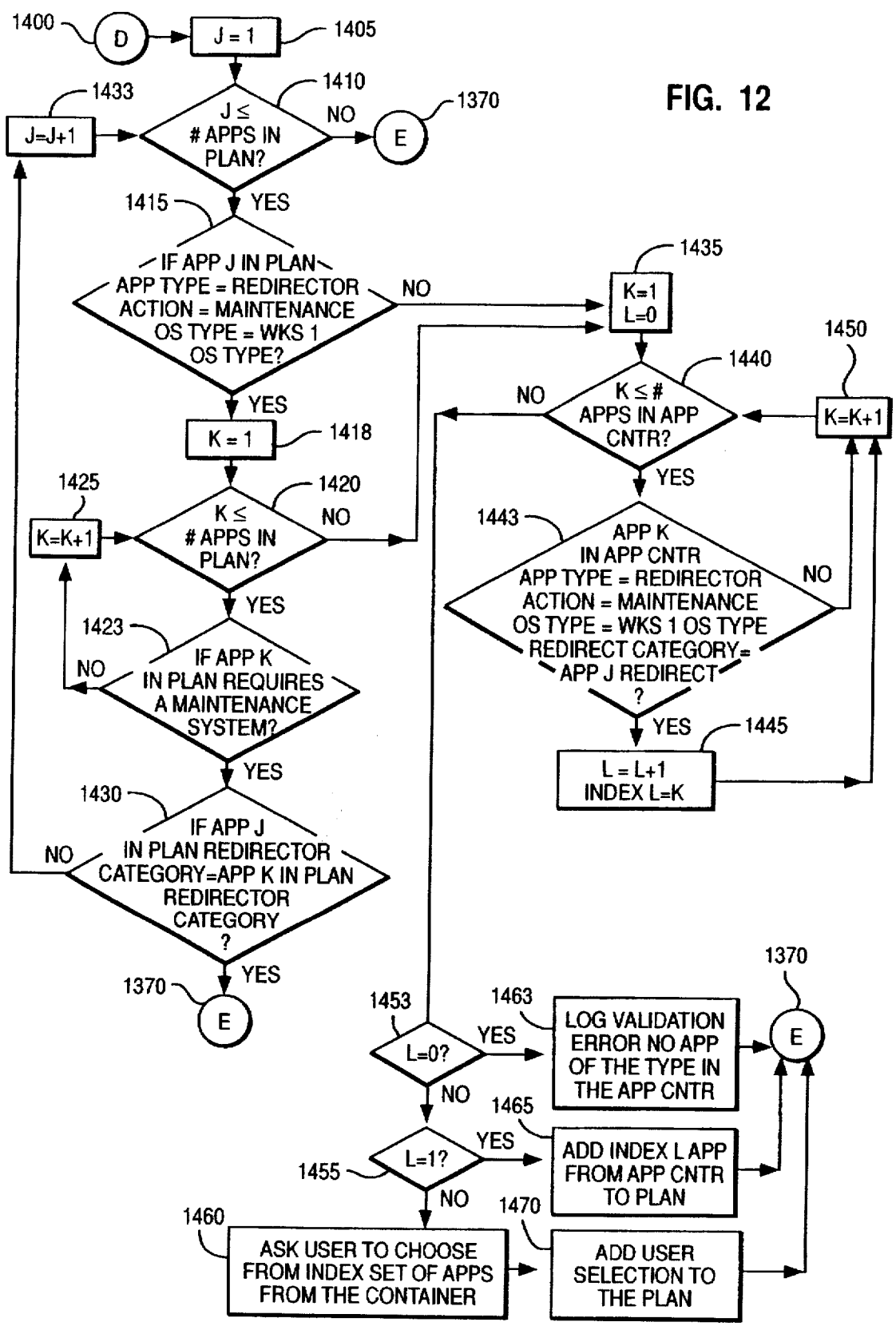

FIG. 12 begins with connecting point D 1400 which directs processing flow to control block 1405 where counter J is set to 1. Next, decision block 1410 checks if counter J is less than or equal to the number of applications in the plan. If this condition is false, then all the applications in the plan have been checked and processing continues to connecting point E 1370 on FIG. 11. If this condition is true, processing continues to decision block 1415 where the application in the plan indexed by J is checked to see if the application type is redirector, action is maintenance, and if the operating system type is equal to the operating system type of the workstation in the plan indexed by I.

If the condition in decision block 1415 is true, processing continues to control block 1418 where counter K is set to 1. Next, decision block 1420 checks if counter K is less than or equal to the number of applications in the plan. If this condition is false, then all of the applications in the plan have been cross checked and processing continues to control block 1435. If not all the applications have been checked in decision block 1420, meaning the condition is true, processing continues to decision block 1423 where the application in the plan indexed by K is checked to see if it requires a maintenance system.

If the indexed application does not require a maintenance system, processing continues to control block 1425 where counter K is incremented by 1. Afterwards, processing continues to decision block 1420.

If the indexed application in decision block 1423 requires a maintenance system, processing continues to decision block 1430 where the application in the plan indexed by J is checked to see if its redirection category is equal to the redirection category of the application in the plan indexed by K. If this condition is true, an application with a matching redirection category was found and processing continues to connecting point E 1370 on FIG. 11. If this condition is false, processing continues to control block 1433 where counter J is incremented by 1. Afterwards, processing resumes at decision block 1410.

At control block 1435, counter K is set to 1 and counter L is set to 0. Processing continues to decision block 1440 where counter K is checked to see if it is less than or equal to the number of applications in the applications container. If this condition is true, processing continues to decision block 1443 where the application in the applications container indexed by K is checked to see if its application type is equal to redirector, action type is equal to maintenance, operating system type is equal to the operating system type of the workstation in the plan indexed by I, and if the redirection category is equal to the redirection category of the application in the plan indexed by J. If this condition is false, processing continues to control block 1450 where counter K is incremented by 1. Afterwards, processing resumes with decision block 1440.

If the condition in decision block 1443 is true, processing continues to control block 1445 where counter L is incremented by 1 and the sequence INDEX indexed by L is set to the value of counter K. Afterwards, processing continues to control block 1450.

If all the applications in the container were checked in decision block 1440, processing continues to decision block 1453. This decision block checks to see if the value for counter L is zero. If this condition is true, processing continues to control block 1463 where a validation error is written to the log file indicating that no applications with an application type of redirector, action type of maintenance, operating system type matching the indexed workstation in the plan, and redirection category matching an application in the applications container. Afterwards, processing continues with connecting point E 1370 in FIG. 11.

If the value of counter L is not zero in decision block 1453, processing continues to decision block 1455 where the value of counter L is checked to see if it is 1. If this condition is true, then exactly one application matching the condition of decision block 1443 was found in the applications container. This matching application can be added by taking a copy of it from the applications container and adding it to the plan automatically in control block 1465. This process increases the set of applications in the plan. Afterwards processing continues with connecting point E 1330 in FIG. 11.

If the value of counter L is not 1 in decision block 1455, processing continues to control block 1460. At this stage, more than one application matches the condition in decision block 1443. A list of these applications are presented to the administrator in control block 1460 and the administrator selects an application from the list populated by the sequence INDEX up to counter L entries. After the selection is made, processing continues with control block 1470 where the administrator-selected application is added to the plan by taking a copy of it from the applications container and adding it to the plan. This processing increases the set of applications in the plan. Afterwards, processing continues with connecting point E 1370 in FIG. 11.

Figure 13:
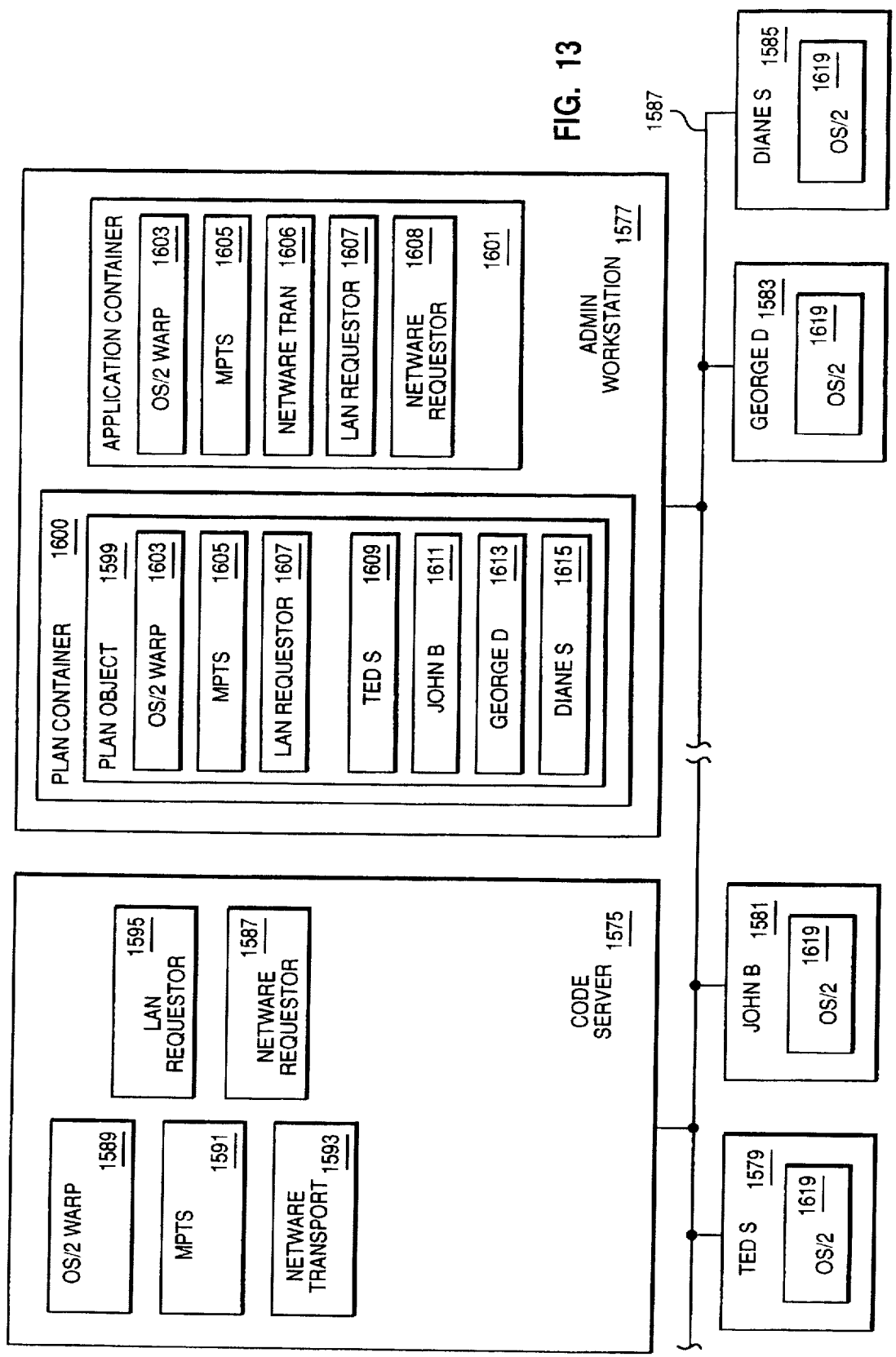
FIG. 13 illustrates a computer network using the validation process of the present invention.

A network in which the present invention might be practiced is illustrated in FIG. 13. A code server 1575, a network administrator's workstation 1577 and four user workstations 1579–1585 are coupled together by means of a network 1587. The code server 1575 contains the actual images of the applications 1589–1597 to be distributed across the network 1589 and installed in the workstations 1579–1585. Although not illustrated, a plurality of code servers could be coupled to the network to store application images. The network administrator's workstation 1577 is where the validation process of the present invention takes place. Note that separate systems may be used for planning process and actual installation of the software.

A plan object 1599, a plan container 1600 and an application container 1601 are shown resident in the administrator's workstation. The plan object 1599 includes application objects 1603, 1605 and 1607 which represent the applications OS/2 WARP 1589, MPTS 1591 and LAN Requestor 1595 stored at the code server 1575. The plan object also includes workstation objects 1609–1615 which represent workstations 1579–1585. The application container in addition to the aforementioned objects also includes a NetWare transport object 1606 representing the NetWare transport 1593 and a NetWare Requestor object 1608 representing the NetWare Requestor 1597.

In the plan object 1599, the application object 1603 representing OS/2 WARP has its action attribute set to install, its application attribute set to operating system, the maintenance system required attribute set to yes and its maintenance system action defined. The application object 1605 representing MPTS has its action attribute set to install, its application type attribute to transport its operating system type to OS/2. The application object 1607 representing LAN Requestor has its action attribute set to install, its application type attribute set to redirector and its operating system type set to OS/2. Since the Netware transport object 1606 and Netware Requestor object 1608 are not in the plan object they do not have action attributes. However, the Netware transport object 1606 has an application type attribute of transport and operating system type attribute of OS/2. The Netware requester object 1608 has an application in type attribute of redirector and an operating system type attribute of OS/2.

Once the network administrator has built the plan object and set the attributes, the plan object must be validated. Following generally the flow diagrams discussed above, the validation process goes through the following steps:

The plan object 1599 is checked for application objects whose application type is transport and action attribute is maintenance. There are no applications in the plan which match these criteria. Validation continues with no warning messages logged.

The plan object 1599 is checked for application objects whose application type attribute is operating system and action attribute is install. Only the application, OS/2 Warp, matches these attributes. Since there is only one application which has these attributes, validation continues with no warning messages logged.

The plan object 1599 is tested for application objects which require a maintenance system. The application object 1603 for OS/2 Warp, matches these criteria. Since there is at least one application which needs a maintenance system validation of the plan object for multiple transports and redirectors continues. To install OS/2 WARP, a maintenance version of OS/2 is required on the drive on which the Pull operating system will be installed.

The plan object 1599 searched for application objects whose application type attribute is operating system and action attribute is install. The application object 1603 for OS/2 Warp matches these criteria. The object 1603 is checked to determine it has a maintenance system action defined. The maintenance action definition is the set of commands and attributes which are necessary for successfully setting up the maintenance version of the OS/2 WARP operating system. Since the object 1603 has the action defined, the operating system validation step is skipped.

The plan object 1599 is checked for application objects whose application type attribute is transport and action attribute is maintenance. No application object in the plan object matches these criteria so the application container 1601 is checked for application objects whose application type is transport and operating system is OS/2. The application objects 1605 and 1606 for MPTS and Netware transport both have these attributes. Since the applications container 1601 has more than one application object which match, the user is presented with a selection dialog listing both of these applications. The user selects MPTS as the transport that will be used to reach the code server where OS/2 Warp is located. After selection, another application object representing MPTS is added to the plan having an action attribute of maintenance. In this embodiment, when a maintenance version of OS/2 is used, the installation plan is constructed so that temporary versions of the transport and redirector are used. The added application objects are distinct from the application objects 1605, 1607 which represent the images of MPTS and LAN Requestor which are to be permanently installed at the workstations.

The plan object 1599 tested for application objects whose application type attribute is redirector and action attribute is maintenance. No application object in the plan object 1599 matches has the attributes so the application container 1601 is searched for application objects whose application type attribute is redirector and operating system is OS/2. The application objects 1606, 1607 for Netware requester and LAN Requester both match these criteria. Since the application container 1601 has more than one application object which match, the user is presented with a selection dialog listing both of these applications. The user selects LAN Requester as the redirector that will be used to reach the code server where OS/2 Warp Fullpak is located.

The plan validation completes without any errors. New objects for the selected transport and redirector, MPTS and LAN requester are added to the plan with their action attribute set to maintenance. The user is given an opportunity to change any attributes of the newly added application objects, before the installation plan object 1599 is committed for installation.

Figure 14:
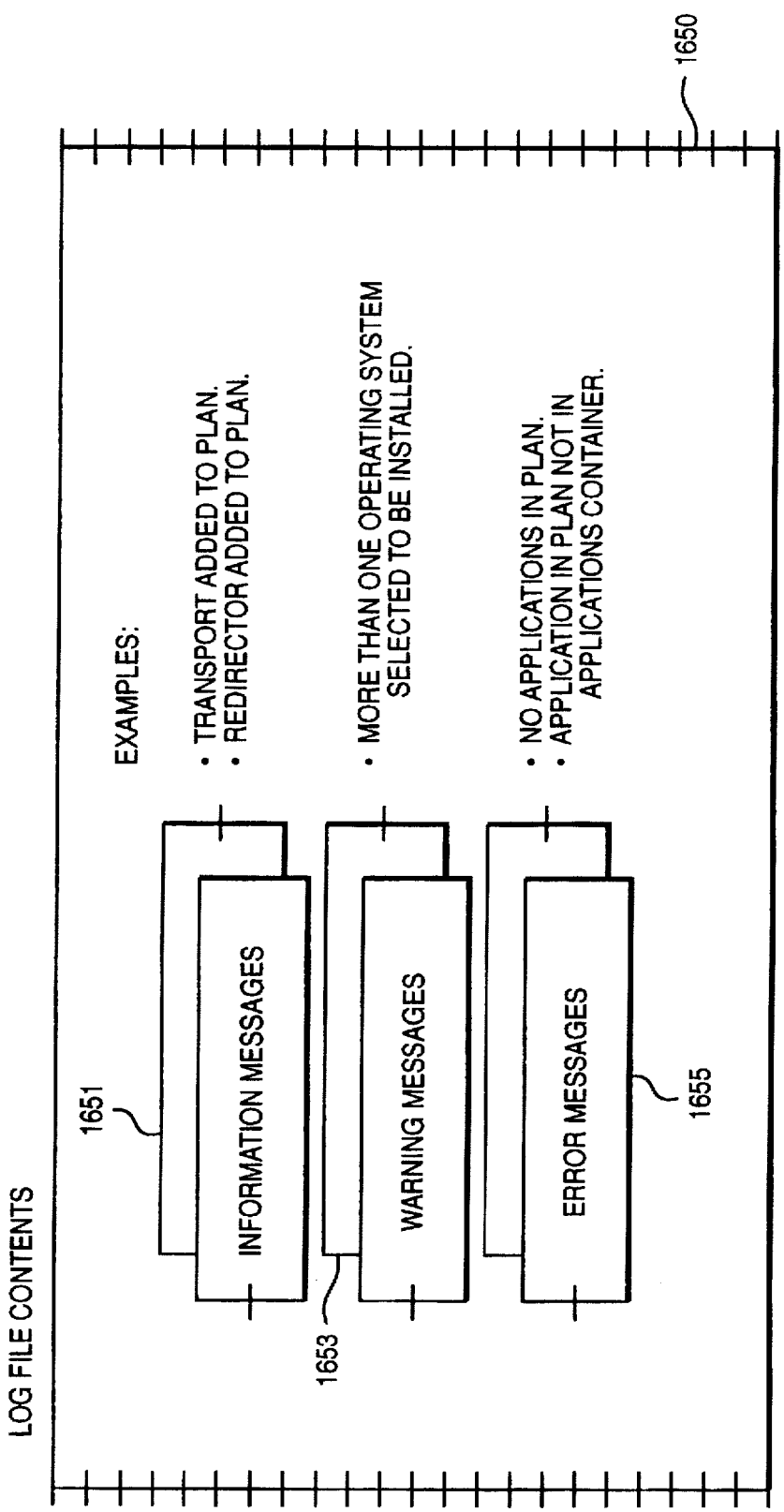
FIG. 14 depicts a sample validation log file.

A sample log file is shown in FIG. 14. The log file 1650 can contain a series of messages such as information messages 1651, warning messages 1653 or error messages 1655. Examples of information messages would include when an application such as a transport or redirector was added to the plan. A warning message might include the message that more than one operating system is selected to be installed. A warning message indicates that there is a potential problem, however, it does not violate the rules of the validation process. Examples of error messages which would prevent the plan from being executed would be that there are no applications in the plan object or that an application is in the plan object but is not available in the application set container. This would indicate that the actual application was unavailable for installation.

While the invention has been shown and described with reference to particular embodiments thereof, it will be understood by those skilled in the art that the invention can be practiced, with modification, in other environments. Although the preferred embodiment is an object based system, other data structures in a procedurally based system could represent the applications to be installed and the workstations on which the installation is to take place. Also, although transports and redirectors are commonly used in the installation process, other types or categorizations of communication modules could be used. Although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for validating an installation plan wherein multiple transports and redirectors are capable of installing a first and a second application on a workstation over a computer network, comprising the steps of:

examining a first and a second application data structure corresponding respectively to the first and second application for a transport and a redirector attribute indicating a respective transport and a respective redirector module to be used for installation of the first and second application on the workstation;

determining whether the indicated transport and redirector modules are available during the installation process at the workstation; and responsive to the determination that at least one of the indicated transport and redirector modules is unavailable, adding a data structure corresponding to the unavailable module to the installation plan such that when the installation plan is executed the previously unavailable module is provided.

2. The method as recited in claim 1 wherein the determining step comprises the step of determining whether data structures corresponding to the indicated transport and redirector modules are present in the installation plan.

3. The method as recited in claim 1 wherein the determining step comprises the step of determining whether a transport and a redirector attribute in a workstation data structure match the transport and redirector attributes of the first and second application data structures, the workstation data structure corresponding to the workstation, the transport and redirector attribute in the workstation data structure indicating whether the transport and redirector are already installed at the workstation.

4. The method as recited in claim 2 further comprising the steps of:

examining an action attribute of the data structures corresponding to the indicated transport and redirector modules to determine whether a maintenance system is required; and examining an operating system attribute of the workstation data structure to determine whether an operating system resident at the workstation is capable of building a maintenance system.

5. The method as recited in claim 2 further comprising the step of examining an action attribute of the data structures corresponding to the indicated transport and redirector modules to determine whether a temporary installation of the indicated transport and redirector modules is desired to accomplish the installation process.

6. The method as recited in claim 1 wherein only a single transport module and a single redirector module may be used to install applications in an installation plan, and the method further comprises the steps of:

determining whether more than one data structure representing a transport module is present in the installation plan;

determining whether more than one data structure representing a redirector module is present in the installation plan; and issuing an error notification responsive to the determination that more than one data structure representing a transport module or redirector module is found in the installation plan.

7. The method as recited in claim 1 wherein the first and second applications are to be installed on a plurality of workstations.

8. The method as recited in claim 1 further comprising the step of prompting the user for the attributes of the first and second application data structures.

9. The method as recited in claim 1 further comprising the step of building the installation plan comprising a set of application data structures provided with an installation program.

10. A system for validating an installation plan object wherein multiple sets of communication modules are capable of installing a plurality of applications on a workstation over a computer network. the system including memory. processor, input and display devices and further comprising:

means for building the installation plan object by including a plurality of application objects representing applications to be installed during an installation process and by including a workstation object representing the workstation;

means for examining attributes of the application objects for a communication module attribute indicating respective sets of communication modules to be used for installation of the plurality of applications on the workstation;

means for determining whether the indicated sets of communication modules are available during the installation process at the workstation; and means responsive to the determination that at least one indicated set of communication modules is unavailable for adding an object representing the unavailable set to the installation plan such that when the installation process is executed the previously unavailable set is provided.

11. The system as recited in claim 10 wherein the determining means determines whether objects corresponding to the indicated sets of communication modules are present in the installation plan.

12. The system as recited in claim 10 wherein the determining means determines whether a communication attribute in the workstation object matches the communication attributes of the plurality of application objects, the communication attribute in the workstation object indicating whether the communication modules are already install ed at the workstation.

13. The system as recited in claim 10 wherein the installation plan comprises a first object representing a first set of communication modules for installing a first application and a second object representing a second set of communication modules for installing a second application.

14. The system as recited in claim 10 wherein the installation plan further comprises a first object representing a first set of communication modules, the first object including an action attribute indicating that a temporary installation of the first set of communication modules is desired during the installation process.

15. The system as recited in claim 10 wherein only a s ingle set of communication modules may be used to install applications in an installation plan . and the system further comprises:

means for examining the attributes of the plurality of application objects for communication module attributes indicating respective sets of communication modules which can be used to install each of the plurality of applications; and means for prompting the user with a list of compatible communication modules to select a set of communication modules for the installation process.

16. The system as recited in claim 15. wherein the communication attribute of an application object contains multiple entries indicating a plurality of communication modules which capable of installing an application which the application object represents.

17. A computer program product |stored| in a computer readable memory for validating an installation plan object including a plurality of application objects each representing an application to be installed during an installation process and a workstation object representing a workstation on which the plurality of applications on which the plurality of applications are to be installed, wherein multiple sets of communication modules are capable of installing a plurality of applications on the workstation over a computer network. comprising:

means for examining attributes of the application objects for a communication module attribute indicating respective sets of communication modules to be used for installation of the plurality of applications on the workstation;

means for determining whether the indicated sets of communication modules are available during the installation process at the workstation; and means responsive to the determination that at least one indicated set of communication modules is unavailable for adding an object representing the unavailable set to the installation plan such that when the installation process is executed the previously unavailable set is provided.

18. The product as recited in claim 17 wherein the determining means determines whether objects corresponding to the indicated sets of communication modules are present in the installation plan.

19. The product as recited in claim 17 wherein the installation plan further comprises a first object representing a first set of communication modules, the first object including an action attribute indicating that a temporary installation of the first set of communication modules is desired during the installation process.

20. The product as recited in claim 17 wherein only a single set of communication modules may be used to install applications in an installation plan. a set of communication modules comprising a transport and a redirector module. and the product further comprises:

means for examining the attributes of the plurality of application objects for at least one redirector module and at least one transport module capable of installing each of the plurality of applications;

means responsive to finding a plurality transport modules or a plurality of redirector modules capable of installing each of the plurality of applications for prompting the user with a list of the plurality of transport modules or redirector modules to select a set of communication modules for the installation process; and means responsive to finding a single transport module or a single redirector module capable of installing each of the plurality of applications for automatically adding an object representing the single transport module or redirector module to the installation plan object.

* * * * *

UNITED STATES PATENT AND TRADEMARK OFFICE
CERTIFICATE OF CORRECTION

PATENT NO : 5,793,982
DATED : August 11, 1998
INVENTOR(S) : Shrader et al

It is certified that error appears in the above-identified patent and that said Letters Patent is hereby corrected as shown below:

Column 6, line 55, please delete "Server)" and substitute --Server,--.

Signed and Sealed this

Fifteenth Day of June, 1999

Attest:

Q. TODD DICKINSON

*Attesting Officer*     *Acting Commissioner of Patents and Trademarks*